Patented Jan. 30, 1940

2,188,387

UNITED STATES PATENT OFFICE 2,188,387

SHEET MATERIAL HAVING CRYSTALLINE EFFECTS

Joseph H. Brown, Brooklyn, N. Y., assignor to Celluloid Corporation, a corporation of New Jersey No Drawing. Application November 22, 1935, Serial No. 51,085

11 Claims. (Cl. 154—2)

This invention relates to sheet material and to articles made therefrom, which sheet material is characterized by having a surface broken by closely spaced small ridges or wrinkles running at random across the same giving the appearance of a crystalline or crackled surface.

This application is a continuation-in-part of my application S. No. 25,419, filed June 7, 1935.

An object of the invention is the economic and expeditious production of ornamental and decorative sheet material having a distinctive design thereon. Other objects of the invention will appear from the following detailed description.

By employing the method of this invention, an improved sheet material may be formed having an effect differing from any heretofore produced on sheet material. The effect is exceptionally useful in the forming of articles such as lamp shades, etc. The design or effect produced in the sheet material by the present invention is that of minute ridges or wrinkles running in an irregular pattern yet substantially uniformly distributed over the area of the material giving a "crackled" appearance to the material.

In accordance with my invention, I form a sheet material having an appearance and other properties adapting it for use as surfacing, decorating and ornamenting material for flat or shaped articles. I form the sheet material from films, foils or sheets of regenerated or reconstituted cellulose, for instance, Cellophane, by laminating the same with one or more similar films, foils or sheets, or films, foils or sheets of other material, such as films, etc., made from an organic derivative of cellulose, with the aid of an adhesive. I then crush, twist, rope or otherwise crease or wrinkle the laminated material, preferably while the adhesive is still tacky. After the pattern is placed in the laminated films or foils, they may be pressed, ironed, smoothed or otherwise flattened without destroying the finish. This flattening operation may be performed by passing the laminated patterned sheets through a calendering device or laundering rolls. The sheet material may be used in the laminated form or each sheet may be stripped from the others to form single sheets, films or foils and used as such.

While crepe sheet material made of cellulose or reconstituted or regenerated cellulose sheets are known, this sheet matrial does not have the properties of the sheets formed in accordance with this invention. The sheet material formed by this invention differs markedly from sheet material exhibiting crepe effects. Furthermore, by prior methods, even crepe effects in such materials were produced only by the aid of astringents such as aluminum sulphate, etc. These astringents were carried on into the finished product thereby rendering the product objectionable for many purposes. The product of this invention not only differs from creped and similar products but is also produced by a different process in which there is employed no astringents.

While sheet material of any suitable thickness may be employed, I prefer to use thin sheets of the type normally referred to as films or foils, and which may have a thickness of from .0001 to .01 of an inch. These films or foils may be made by any suitable method. Films containing a regenerated cellulose may be formed by casting a solution of cuprammonium cellulose or cellulose xanthate upon a film casting wheel or by extruding the same through a suitable shaped orifice and then so treating the film or foil thus produced to regenerate the cellulose. The films or foils of organic derivatives of cellulose that may be used in connection with the films or foils of regenerated cellulose may be made by any suitable method, such as by casting the same from a solution containing a derivative of cellulose in a volatile solvent upon a film casting wheel or by extruding the solution through a suitable shaped orifice into an evaporative or precipitating medium. Although the above methods are those normally employed in forming the films and foils of regenerated or reconstituted cellulose and derivatives of cellulose, the films or foils may be formed by other methods such as by planing the same from a relatively thick block of the material.

The film or foil may contain, besides the regenerated or reconstituted cellulose base material, other suitable materials that affect the physical properties of the resultant film or foil. Such other materials, which are called effect materials, may be dyes, lakes, pigments, fire retardants, filling materials, waterproofing agents, etc. Films or foils formed from organic derivatives of cellulose that may be used in connection with the films or foils of regenerated or reconstituted cellulose may contain, besides such effect materials, a suitable plasticizer for the organic derivative of cellulose. The films or foils of organic derivatives of cellulose, if employed, are those having from 5-100 parts or more of plasticizer, based on the weight of the derivative of cellulose present. The amount of plasticizer employed will depend upon the desired hand, such as springiness, crispness, etc., of the resulting material, the type and quantity of included materials present and other similar variables. The plasticizers may be any of the high boiling solvents or softening agents for the organic derivative of cellulose, as, for example, the aryl sulphonamides such as para ethyl toluol sulphonamide, the alkyl phthalates such as dimethyl phthalates, the dialkyl tartrates such as dibutyl tartrate, the alkoxy esters of polybasic organic acids such as diethoxy ethyl phthalate, the polybasic acid esters of the mono alkyl ethers of polyhydric alcohols such as diethylene glycol ethyl ether ester of phthalic acid, the alkyl esters of phosphoric acid such as triethylglycol phosphate, the aryl esters of phosphoric acid such as tricresyl phosphate, the mixed alkyl and aryl phosphates such as ethylglycol dicresyl phosphate, and camphor. Sheet material having a crystalline, wrinkled or crackled effect may be made by uniting or superimposing two or more layers of films or foils, one or all of which are formed from a base material of regenerated or reconstituted cellulose, with a suitable adhesive, such as shellac, tinting or otherwise crushing the composite film either by hand or machine. For instance, relatively long strips of the foil containing intermediate layers of shellac may be superimposed upon each other and these strips twisted or crushed by a method known in the rope manufacture industry as "rope walking." The rope walking operation is performed by taking a strip of laminated layers of films or foils, say 50 feet long, and looping this around the hub of a slow moving wheel or propeller, the operator pulling the two ends of the strip tight by walking away from the moving device. When the shaft or propeller rotates it twists the films into the form of a heavy rope, the operator being forced to walk slowly toward the machine. Upon unwinding he steps back and the operation may be repeated in the oposite direction if desired to increase or make more uniform the crackle or crinkle effect. After unfolding the film may be ironed, smoothed or flattened either by hand or by passing it through calendering or laundering rolls without destroying the finish.

Any suitable type of adhesive may be employed for cementing the various layers of the laminations together prior to roping or crushing. It is not important that the adhesive agent be such that there is an excellent bonding action between the layers, for in many cases it may be desired to strip the various layers from each other after roping or crushing. Also, for many purposes, a perfect adhesion is not necessary and the material may be sewed or covered at the edges to hold the same together. The adhesive employed may be shellac either refined, i. e., bleached, dewaxed, moisture-free, etc., or the commercial grade of orange shellac such as sold in paint stores. For application to the film the shellac is preferably disolved or dispersed in a vehicle or a thinner. The solvent vehicle may be grain alcohol, denatured grain alcohol, wood alcohol or the like. While the preferred concentration is 5 lbs. of shellac to a gallon of thinner, other suitable proportions may be used such as from 3 to 8 or more lbs. of shellac to the gallon of thinner.

As an aid in causing the adhesive agent to bind the sheets together in assemblies wherein the film or foils containing organic derivatives of cellulose are employed, small quantities of strong solvents for the derivatives of cellulose may also be added to the shellac. In such compositions, for instance, the adhesive material may contain besides shellac and the vehicle small quantities of acetone, methyl cellosolve, methyl cellosolve acetate, diacetone alcohol, etc. If desired, the shellac may be entirely replaced by other adhesives, such as those described in U. S. Patents Nos. 1,981,141 and 1,950,954. Adhesives as described in U. S. Patent No. 1,925,903 may also be used.

Suitable effect materials may be added to the laminated structure by incorporating same or suspending same in the adhesive or to the moistened surface of the film or foil. Such effect material may be, for instance, zinc oxide, aluminum powder, dyes, silky variety of mercurous chloride, silicious matter such as diatomaceous earths, tinsel (Lahn), pearl flakes, silk or metallic threads.

When roping the laminated films or foils that have been bound together with shellac, there may be a likelihood, due to excessive softening attack of the adhesive, for the twisted mass to stick together and resist unwinding. To overcome this a muslin cloth, netting or other suitable material may be used to prevent the folds from sticking together in a rope walking operation. Where the laminated films or foils have a layer of regenerated cellulose or film containing chemically treated rubber as the two outer layers, no muslin cloth or netting need be employed.

The resultant crystalline product while laminated, or in individual sheets of crystalline material may be subjected to embossing and pleating operations to produce novel ornamental effects. This material may also be laminated with other materials such as paper, fabric, etc. Dye solutions may be applied to the rough surface and the excess of the coloring matter wiped off, and the material so treated interposed between glass plates to yield artistic decorative articles. Furthermore, the material may be molded, composited, slit into narrow ribbon form, or otherwise shaped, and/or printed, colored or otherwise ornamented.

The wrinkled or crackled sheet material may be used for many purposes. For instance, a transparent variety, either in single sheets or in the laminated form, may be employed as lamp shades, screens and like uses where light is transmitted through the material, thus producing a beautiful crystalline effect. The filled or pigmented variety, as well as the transparent material, may be laminated with or veneered on wood panels, metal, leather, cloth, etc., to form wall decorations, table tops and similar uses to produce a crackled effect similar to that obtained by spraying with lacquers. Pocketbooks, wearing apparel, millinery, accessories, etc. may be made from the foil itself, especially the laminated variety, either alone or after veneering the same to leather or cloth. When employing a cementing material which forms a substantially permanent bond between various layers of the product, the product may be used for upholstery purposes and similar places where a substantial amount of wear is imposed upon the article.

It is to be understood that the foregoing detailed description is given merely by way of illustration and that many variations may be made therein without departing from the spirit of my invention.

Having described my invention, what I desire to secure by Letters Patent is:

1. In a method of producing a crinkled sheet material containing regenerated or reconstituted cellulose, the steps of causing at least two films, one of which contains regenerated or reconstituted cellulose, to adhere together by the action of cement, crinkling the laminated material and smoothing out the crinkled material.

2. In a method of producing a crinkled sheet material containing regenerated or reconstituted cellulose, the steps of causing at least two films, one of which contains a derivative of cellulose and another of which contains reconstituted or regenerated cellulose, to adhere together by the action of a cement, crinkling the laminated material and smoothing out the crinkled material.

3. In a method of producing a crinkled sheet material containing regenerated or reconstituted cellulose, the steps of causing at least two films, one of which contains regenerated or reconstituted cellulose, to adhere together by the action of cement, crinkling the laminated material, smoothing out the crinkled material and stripping the sheets from each other.

4. In a method of producing a crinkled sheet material containing regenerated or reconstituted cellulose, the steps of causing at least two films, one of which contains a derivative of cellulose and another of which contains reconstituted or regenerated cellulose, to adhere together by the action of a cement, crinkling the laminated material, smoothing out the crinkled material and stripping the sheets from each other.

5. In a method of producing crinkled sheet material containing reconstituted or regenerated cellulose, the steps of laminating with the aid of a cement at least two sheets having a thickness less than .02 inch, at least one of which is formed of reconstituted or regenerated cellulose, roping the laminated material and smoothing out said material.

6. In a method of producing crinkled sheet material containing reconstituted or regenerated cellulose, the steps of laminating with the aid of a cement at least two sheets having a thickness less than .02 inch, at least one of which is formed of reconstituted or regenerated cellulose, roping the laminated material, smoothing out said material and stripping the sheets from each other.

7. In a method of producing crinkled sheet material containing reconstituted or regenerated cellulose, the steps of laminating with the aid of a cement at least two sheets having a thickness less than .02 inch formed of a reconstituted or regenerated cellulose, roping the laminated material and smoothing out said material.

8. In a method of producing crinkled sheet material containing reconstituted or regenerated cellulose, the steps of laminating with the aid of a cement at least two sheets having a thickness less than .02 inch formed of a reconstituted or regenerated cellulose, roping the laminated material, smoothing out said material and stripping the sheets from each other.

9. In a method of producing crinkled sheet material containing reconstituted or regenerated cellulose, the steps of laminating with the aid of a shellac at least two sheets having a thickness less than .02 inch formed of a reconstituted or regenerated cellulose, roping the laminated materials and smoothing out said material.

10. In a method of producing crinkled sheet material containing reconstituted or regenerated cellulose, the steps of laminating with the aid of a shellac at least two sheets having a thickness less than .02 inch formed of a reconstituted or regenerated cellulose, roping the laminated material, smoothing out said material and stripping the sheets from each other.

11. A crinkled sheet material containing reconstituted or regenerated cellulose consisting of a plurality of thin sheets containing reconstituted or regenerated cellulose laminated and bound together with a cement and characterized by having a crackled appearance.

JOSEPH H. BROWN.